(12) United States Patent
Moskowitz et al.

(10) Patent No.: US 8,738,419 B2
(45) Date of Patent: *May 27, 2014

(54) SYSTEM AND METHOD FOR PERFORMING CONJOINT ANALYSIS

(75) Inventors: Howard R. Moskowitz, White Plains, NY (US); Alexander Gofman, Cortlandt Manor, NY (US)

(73) Assignee: I Novation Inc., White Plains, NY (US)

(*) Notice: Subject to any disclaimer, the term of this patent is extended or adjusted under 35 U.S.C. 154(b) by 34 days.

This patent is subject to a terminal disclaimer.

(21) Appl. No.: 13/103,661

(22) Filed: May 9, 2011

(65) Prior Publication Data

US 2011/0270648 A1    Nov. 3, 2011

Related U.S. Application Data

(63) Continuation of application No. 11/032,834, filed on Jan. 10, 2005, now Pat. No. 7,941,335.

(60) Provisional application No. 60/538,787, filed on Jan. 23, 2004.

(51) Int. Cl.
*G06Q 10/00* (2012.01)

(52) U.S. Cl.
USPC .......................................... 705/7.29; 705/7.11

(58) Field of Classification Search
USPC ...................... 705/7.29, 7.31, 7.32, 7.33, 7.11
See application file for complete search history.

(56) References Cited

U.S. PATENT DOCUMENTS

| | | | |
|---|---|---|---|
| 5,124,911 A * | 6/1992 | Sack | 705/7.32 |
| 5,666,368 A | 9/1997 | Proulx | |
| 5,901,155 A | 5/1999 | Proulx | |
| 6,253,193 B1 | 6/2001 | Ginter et al. | |
| 6,405,159 B2 * | 6/2002 | Bushey et al. | 703/13 |
| 6,662,215 B1 * | 12/2003 | Moskowitz et al. | 709/217 |
| 2002/0184075 A1 * | 12/2002 | Hertz et al. | 705/10 |
| 2003/0040954 A1 * | 2/2003 | Zelek et al. | 705/10 |
| 2003/0088458 A1 * | 5/2003 | Afeyan et al. | 705/10 |
| 2003/0195793 A1 * | 10/2003 | Jain et al. | 705/10 |
| 2004/0193477 A1 | 9/2004 | Barzuza | |
| 2005/0177388 A1 * | 8/2005 | Moskowitz et al. | 705/1 |
| 2011/0270648 A1 * | 11/2011 | Moskowitz et al. | 705/7.29 |

OTHER PUBLICATIONS

Conjoint Analysis, Related Modeling and Applications—By Hauser et al. Sep. 23, 2002.*
Use of Conjoint analysis to assess web-based communications on functional foods.—By Howard Moskowitz et al. Jun. 20, 2002.*
Understanding the Sensory Person Mindset on Profession 2003 Professional Study Orientation—by Moskowitz Jacobs, Inc. Strategic Brand Developers: Research & Consulting.

* cited by examiner

*Primary Examiner* — Beth V Boswell
*Assistant Examiner* — Ernest A Jackson
(74) *Attorney, Agent, or Firm* — Kenyon & Kenyon LLP

(57) ABSTRACT

In a system and method for conjoint analysis, corresponding utility values are determined for a plurality of individual concept elements and for combinations of multiple concept elements, e.g., pair wise combinations of concept elements. A regression technique, e.g., least squares linear regression, may be used to determine the utility values.

27 Claims, 8 Drawing Sheets

Figure 1

| Category Placeholder PL₁ | | | | Category Placeholder PL₂ | | | | Category Placeholder PL₃ | | | | Category Placeholder PL₄ | | | | Category Placeholder PL₅ | | | |
|---|---|---|---|---|---|---|---|---|---|---|---|---|---|---|---|---|---|---|---|
| $pl_{11}$ | $pl_{12}$ | $pl_{13}$ | $pl_{14}$ | $pl_{21}$ | $pl_{22}$ | $pl_{23}$ | $pl_{24}$ | $pl_{31}$ | $pl_{32}$ | $pl_{33}$ | $pl_{34}$ | $pl_{41}$ | $pl_{42}$ | $pl_{43}$ | $pl_{44}$ | $pl_{51}$ | $pl_{52}$ | $pl_{53}$ | $pl_{54}$ |
| 0 | 0 | 0 | 1 | 0 | 0 | 0 | 1 | 0 | 0 | 0 | 1 | 1 | 0 | 0 | 0 | 0 | 1 | 0 | 0 |
| 0 | 0 | 1 | 0 | 0 | 0 | 1 | 0 | 0 | 0 | 1 | 0 | 1 | 0 | 0 | 0 | 0 | 0 | 0 | 0 |
| 0 | 0 | 0 | 1 | 0 | 0 | 0 | 0 | 0 | 1 | 0 | 0 | 0 | 1 | 0 | 0 | 1 | 0 | 0 | 0 |
| 0 | 0 | 1 | 0 | 0 | 0 | 0 | 1 | 1 | 0 | 0 | 0 | 0 | 1 | 0 | 0 | 0 | 0 | 0 | 1 |
| 0 | 1 | 0 | 0 | 0 | 0 | 1 | 0 | 0 | 0 | 0 | 0 | 0 | 1 | 0 | 0 | 0 | 1 | 0 | 0 |
| 1 | 0 | 0 | 0 | 0 | 0 | 1 | 0 | 0 | 1 | 0 | 0 | 0 | 0 | 1 | 0 | 0 | 0 | 0 | 1 |
| 0 | 1 | 0 | 0 | 1 | 0 | 0 | 0 | 0 | 0 | 0 | 1 | 0 | 0 | 0 | 0 | 0 | 0 | 0 | 1 |
| 0 | 0 | 0 | 0 | 0 | 1 | 0 | 0 | 1 | 0 | 0 | 0 | 0 | 0 | 1 | 0 | 0 | 1 | 0 | 0 |
| 0 | 0 | 1 | 0 | 0 | 1 | 0 | 0 | 0 | 0 | 0 | 0 | 0 | 0 | 0 | 0 | 1 | 0 | 0 | 0 |
| 0 | 0 | 0 | 1 | 1 | 0 | 0 | 0 | 0 | 0 | 0 | 0 | 0 | 0 | 1 | 0 | 0 | 0 | 0 | 0 |
| 0 | 0 | 1 | 0 | 1 | 0 | 0 | 0 | 0 | 1 | 0 | 0 | 0 | 0 | 0 | 1 | 0 | 1 | 0 | 0 |
| 0 | 1 | 0 | 0 | 0 | 1 | 0 | 0 | 0 | 1 | 0 | 0 | 1 | 0 | 0 | 0 | 0 | 0 | 1 | 0 |
| 1 | 0 | 0 | 0 | 0 | 0 | 0 | 0 | 0 | 0 | 1 | 0 | 0 | 0 | 0 | 0 | 0 | 1 | 0 | 0 |
| 1 | 0 | 0 | 0 | 0 | 0 | 0 | 1 | 0 | 0 | 0 | 0 | 0 | 0 | 0 | 1 | 0 | 0 | 1 | 0 |
| 0 | 0 | 1 | 0 | 0 | 0 | 0 | 0 | 0 | 0 | 0 | 1 | 0 | 0 | 1 | 0 | 0 | 0 | 1 | 0 |
| 0 | 1 | 0 | 0 | 0 | 0 | 0 | 0 | 1 | 0 | 0 | 0 | 0 | 0 | 0 | 1 | 0 | 0 | 0 | 0 |
| 1 | 0 | 0 | 0 | 0 | 1 | 0 | 0 | 0 | 0 | 0 | 1 | 0 | 1 | 0 | 0 | 0 | 0 | 0 | 0 |
| 0 | 1 | 0 | 0 | 0 | 0 | 0 | 1 | 0 | 0 | 1 | 0 | 0 | 0 | 1 | 0 | 1 | 0 | 0 | 0 |
| 0 | 0 | 0 | 0 | 0 | 0 | 0 | 0 | 0 | 0 | 0 | 0 | 1 | 0 | 0 | 0 | 0 | 0 | 0 | 1 |
| 0 | 0 | 0 | 0 | 0 | 0 | 0 | 1 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 1 | 0 | 0 | 0 | 1 | 1 | 0 | 0 | 0 |
| 0 | 0 | 0 | 0 | 1 | 0 | 0 | 0 | 0 | 0 | 1 | 0 | 0 | 1 | 0 | 0 | 0 | 0 | 1 | 0 |
| 0 | 0 | 0 | 1 | 0 | 0 | 1 | 0 | 1 | 0 | 0 | 0 | 0 | 0 | 0 | 0 | 0 | 0 | 1 | 0 |
| 0 | 0 | 0 | 1 | 0 | 1 | 0 | 0 | 0 | 0 | 1 | 0 | 0 | 0 | 1 | 0 | 0 | 0 | 0 | 1 |
| 1 | 0 | 0 | 0 | 1 | 0 | 0 | 0 | 1 | 0 | 0 | 0 | 1 | 0 | 0 | 0 | 1 | 0 | 0 | 0 |

Figure 2

| Cat PL$_1$ → Cat D | Cat PL$_1$ → Cat B | Cat PL$_1$ → Cat E | Cat PL$_1$ → Cat B |
|---|---|---|---|
| pl$_{11}$ → D$_2$ | pl$_{11}$ → B$_3$ | pl$_{11}$ → E$_1$ | pl$_{11}$ → B$_1$ |
| pl$_{12}$ → D$_4$ | pl$_{12}$ → B$_1$ | pl$_{12}$ → E$_4$ | pl$_{12}$ → B$_4$ |
| pl$_{13}$ → D$_1$ | pl$_{13}$ → B$_2$ | pl$_{13}$ → E$_2$ | pl$_{13}$ → B$_2$ |
| pl$_{14}$ → D$_3$ | pl$_{14}$ → B$_4$ | pl$_{14}$ → E$_3$ | pl$_{14}$ → B$_3$ |
| Cat PL$_2$ → Cat C | Cat PL$_2$ → Cat E | Cat PL$_2$ → Cat C | Cat PL$_2$ → E |
| pl$_{21}$ → C$_4$ | pl$_{21}$ → E$_2$ | pl$_{21}$ → C$_3$ | pl$_{21}$ → E$_4$ |
| pl$_{22}$ → C$_3$ | pl$_{22}$ → E$_3$ | pl$_{22}$ → C$_2$ | pl$_{22}$ → E$_1$ |
| pl$_{23}$ → C$_1$ | pl$_{23}$ → E$_4$ | pl$_{23}$ → C$_4$ | pl$_{23}$ → E$_2$ |
| pl$_{24}$ → C$_2$ | pl$_{24}$ → E$_1$ | pl$_{24}$ → C$_1$ | pl$_{24}$ → E$_3$ |
| Cat PL$_3$ → Cat A | Cat PL$_3$ → Cat D | Cat PL$_3$ → Cat D | Cat PL$_3$ → Cat C |
| pl$_{31}$ → A$_3$ | pl$_{31}$ → D$_1$ | pl$_{31}$ → D$_1$ | pl$_{31}$ → C$_2$ |
| pl$_{32}$ → A$_1$ | pl$_{32}$ → D$_3$ | pl$_{32}$ → D$_4$ | pl$_{32}$ → C$_3$ |
| pl$_{33}$ → A$_4$ | pl$_{33}$ → D$_2$ | pl$_{33}$ → D$_2$ | pl$_{33}$ → C$_1$ |
| pl$_{34}$ → A$_2$ | pl$_{34}$ → D$_4$ | pl$_{34}$ → D$_3$ | pl$_{34}$ → C$_4$ |
| Cat PL$_4$ → Cat E | Cat PL$_4$ → Cat A | Cat PL$_4$ → Cat B | Cat PL$_4$ → Cat A |
| pl$_{41}$ → E$_4$ | pl$_{41}$ → A$_4$ | pl$_{41}$ → B$_2$ | pl$_{41}$ → A$_3$ |
| pl$_{42}$ → E$_3$ | pl$_{42}$ → A$_3$ | pl$_{42}$ → B$_1$ | pl$_{42}$ → A$_1$ |
| pl$_{43}$ → E$_2$ | pl$_{43}$ → A$_2$ | pl$_{43}$ → B$_4$ | pl$_{43}$ → A$_2$ |
| pl$_{44}$ → E$_1$ | pl$_{44}$ → A$_1$ | pl$_{44}$ → B$_3$ | pl$_{44}$ → A$_4$ |
| Cat PL$_5$ → Cat B | Cat PL$_5$ → Cat C | Cat PL$_5$ → Cat A | Cat PL$_5$ → Cat D |
| pl$_{51}$ → B$_3$ | pl$_{51}$ → C$_3$ | pl$_{51}$ → A$_3$ | pl$_{51}$ → D$_1$ |
| pl$_{52}$ → B$_4$ | pl$_{52}$ → C$_4$ | pl$_{52}$ → A$_2$ | pl$_{52}$ → D$_4$ |
| pl$_{53}$ → B$_2$ | pl$_{53}$ → C$_1$ | pl$_{53}$ → A$_4$ | pl$_{53}$ → D$_3$ |
| pl$_{54}$ → B$_1$ | pl$_{54}$ → C$_2$ | pl$_{54}$ → A$_1$ | pl$_{54}$ → D$_2$ |

Figure 3
Category 1(A): Background
A1  A2  A3  A4
Category 2(B): Tea Cups
B1  B2  B3  B4
Category 3(C): Tag Lines
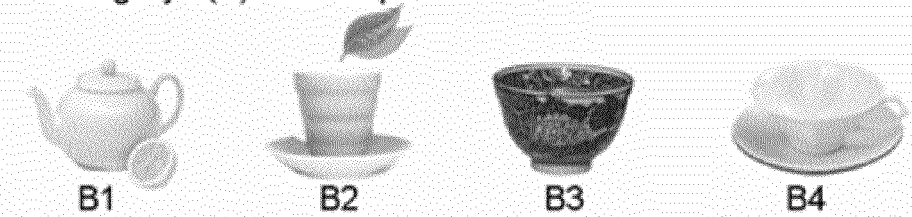
C1  C2  C3  C4
Category 4(D): Ingredients
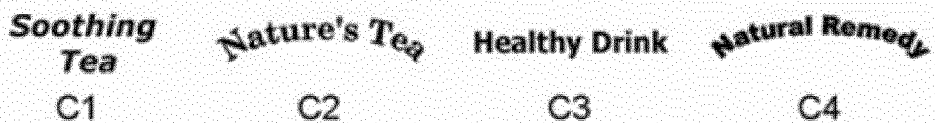
D1  D2  D3  D4
Category 5(E): Package Visuals
E1  E2  E3  E4

Figure 5

| Category A | | | | Category B | | | | Category C | | | | Category D | | | | Category E | | | | Rating |
|---|---|---|---|---|---|---|---|---|---|---|---|---|---|---|---|---|---|---|---|---|
| A1 | A2 | A3 | A4 | B1 | B2 | B3 | B4 | C1 | C2 | C3 | C4 | D1 | D2 | D3 | D4 | E1 | E2 | E3 | E4 | |
| 0 | 1 | 0 | 0 | 0 | 0 | 1 | 0 | 0 | 0 | 0 | 1 | 1 | 0 | 0 | 0 | 0 | 0 | 0 | 1 | 5 |
| 0 | 1 | 0 | 0 | 0 | 0 | 1 | 0 | 0 | 0 | 1 | 0 | 0 | 0 | 0 | 0 | 0 | 1 | 0 | 0 | 1 |
| 1 | 0 | 0 | 0 | 0 | 1 | 0 | 0 | 0 | 1 | 0 | 0 | 0 | 1 | 0 | 0 | 0 | 0 | 0 | 0 | 1 |
| 0 | 1 | 0 | 0 | 1 | 0 | 0 | 0 | 1 | 0 | 0 | 0 | 0 | 0 | 0 | 0 | 0 | 0 | 0 | 1 | 1 |
| 0 | 0 | 1 | 0 | 0 | 0 | 0 | 0 | 0 | 0 | 0 | 1 | 0 | 0 | 1 | 0 | 0 | 1 | 0 | 0 | 1 |
| 1 | 0 | 0 | 0 | 0 | 1 | 0 | 0 | 0 | 1 | 0 | 0 | 0 | 0 | 1 | 0 | 1 | 0 | 0 | 0 | 5 |
| 0 | 0 | 1 | 0 | 0 | 1 | 0 | 0 | 1 | 0 | 0 | 0 | 0 | 0 | 0 | 0 | 0 | 1 | 0 | 0 | 1 |
| 0 | 0 | 0 | 1 | 1 | 0 | 0 | 0 | 1 | 0 | 0 | 0 | 1 | 0 | 0 | 0 | 0 | 1 | 0 | 0 | 5 |
| 0 | 0 | 0 | 0 | 0 | 0 | 1 | 0 | 0 | 1 | 0 | 0 | 1 | 0 | 0 | 0 | 0 | 0 | 1 | 0 | 5 |
| 0 | 1 | 0 | 0 | 1 | 0 | 0 | 0 | 0 | 0 | 0 | 1 | 0 | 0 | 0 | 0 | 1 | 0 | 0 | 0 | 1 |
| 1 | 0 | 0 | 0 | 0 | 0 | 0 | 1 | 0 | 0 | 0 | 1 | 0 | 0 | 0 | 1 | 0 | 1 | 0 | 0 | 5 |
| 0 | 0 | 0 | 1 | 0 | 0 | 0 | 1 | 1 | 0 | 0 | 0 | 0 | 0 | 0 | 1 | 0 | 0 | 0 | 0 | 1 |
| 1 | 0 | 0 | 0 | 1 | 0 | 0 | 0 | 0 | 0 | 1 | 0 | 1 | 0 | 0 | 0 | 0 | 0 | 1 | 0 | 5 |
| 0 | 0 | 0 | 1 | 0 | 1 | 0 | 0 | 0 | 0 | 1 | 0 | 1 | 0 | 0 | 0 | 1 | 0 | 0 | 0 | 6 |
| 0 | 1 | 0 | 0 | 0 | 0 | 0 | 1 | 1 | 0 | 0 | 0 | 0 | 0 | 1 | 0 | 0 | 0 | 1 | 0 | 5 |
| 0 | 1 | 0 | 0 | 0 | 0 | 0 | 1 | 0 | 0 | 0 | 1 | 0 | 0 | 1 | 0 | 0 | 0 | 0 | 1 | 6 |
| 0 | 0 | 1 | 0 | 1 | 0 | 0 | 0 | 0 | 0 | 0 | 1 | 0 | 0 | 1 | 0 | 1 | 0 | 0 | 0 | 7 |
| 0 | 0 | 0 | 1 | 0 | 0 | 0 | 0 | 0 | 1 | 0 | 0 | 0 | 1 | 0 | 0 | 1 | 0 | 0 | 0 | 7 |
| 0 | 1 | 0 | 0 | 0 | 0 | 1 | 0 | 0 | 1 | 0 | 0 | 0 | 0 | 0 | 1 | 0 | 0 | 0 | 1 | 6 |
| 0 | 1 | 0 | 0 | 0 | 0 | 0 | 0 | 0 | 0 | 1 | 0 | 1 | 0 | 0 | 0 | 0 | 1 | 0 | 0 | 1 |
| 0 | 0 | 0 | 1 | 1 | 0 | 0 | 0 | 0 | 1 | 0 | 0 | 0 | 0 | 1 | 0 | 0 | 1 | 0 | 0 | 6 |
| 0 | 1 | 0 | 0 | 1 | 0 | 0 | 0 | 0 | 0 | 1 | 0 | 0 | 1 | 0 | 0 | 0 | 0 | 0 | 1 | 5 |
| 1 | 0 | 0 | 0 | 0 | 0 | 0 | 1 | 0 | 0 | 0 | 1 | 0 | 0 | 0 | 1 | 0 | 0 | 1 | 0 | 6 |
| 1 | 0 | 0 | 0 | 0 | 0 | 0 | 0 | 1 | 0 | 0 | 0 | 0 | 0 | 0 | 1 | 1 | 0 | 0 | 0 | 1 |
| 0 | 0 | 1 | 0 | 0 | 1 | 0 | 0 | 1 | 0 | 0 | 0 | 1 | 0 | 0 | 0 | 0 | 0 | 1 | 0 | 7 |
| 1 | 0 | 0 | 0 | 0 | 1 | 0 | 0 | 0 | 1 | 0 | 0 | 0 | 0 | 1 | 0 | 0 | 0 | 0 | 1 | 7 |
| 1 | 0 | 0 | 0 | 1 | 0 | 0 | 0 | 0 | 1 | 0 | 0 | 0 | 0 | 1 | 0 | 0 | 0 | 1 | 0 | 7 |
| 0 | 1 | 0 | 0 | 0 | 0 | 1 | 0 | 0 | 0 | 1 | 0 | 1 | 0 | 0 | 0 | 1 | 0 | 0 | 0 | 1 |
| 0 | 0 | 0 | 0 | 0 | 1 | 0 | 0 | 1 | 0 | 0 | 0 | 0 | 1 | 0 | 0 | 0 | 0 | 1 | 0 | 3 |
| 0 | 0 | 1 | 0 | 0 | 0 | 0 | 1 | 0 | 0 | 0 | 0 | 1 | 0 | 0 | 0 | 0 | 0 | 0 | 1 | 1 |
| 1 | 0 | 0 | 0 | 0 | 0 | 1 | 0 | 0 | 0 | 0 | 0 | 0 | 1 | 0 | 0 | 0 | 0 | 1 | 0 | 1 |
| 0 | 0 | 0 | 1 | 0 | 0 | 0 | 1 | 0 | 1 | 0 | 0 | 0 | 1 | 0 | 0 | 0 | 1 | 0 | 0 | 7 |
| 0 | 0 | 1 | 0 | 0 | 1 | 0 | 0 | 0 | 0 | 0 | 1 | 0 | 1 | 0 | 0 | 0 | 0 | 0 | 1 | 5 |
| 0 | 0 | 1 | 0 | 0 | 1 | 0 | 0 | 0 | 0 | 1 | 0 | 1 | 0 | 0 | 0 | 0 | 0 | 1 | 0 | 3 |
| 1 | 0 | 0 | 0 | 1 | 0 | 0 | 0 | 0 | 0 | 0 | 0 | 0 | 0 | 0 | 1 | 1 | 0 | 0 | 0 | 1 |
| 0 | 0 | 1 | 0 | 0 | 0 | 1 | 0 | 1 | 0 | 0 | 0 | 0 | 1 | 0 | 0 | 0 | 0 | 1 | 0 | 5 |
| 0 | 0 | 0 | 1 | 0 | 0 | 1 | 0 | 0 | 0 | 1 | 0 | 0 | 0 | 0 | 1 | 0 | 0 | 1 | 0 | 4 |
| 0 | 0 | 0 | 0 | 0 | 0 | 1 | 0 | 0 | 1 | 0 | 0 | 0 | 0 | 0 | 1 | 1 | 0 | 0 | 0 | 6 |
| 0 | 0 | 0 | 1 | 1 | 0 | 0 | 0 | 0 | 0 | 0 | 1 | 1 | 0 | 0 | 0 | 0 | 0 | 0 | 0 | 1 |
| 1 | 0 | 0 | 0 | 1 | 0 | 0 | 0 | 0 | 0 | 1 | 0 | 0 | 0 | 0 | 1 | 0 | 1 | 0 | 0 | 3 |
| 0 | 0 | 1 | 0 | 0 | 0 | 0 | 1 | 0 | 1 | 0 | 0 | 0 | 0 | 0 | 1 | 0 | 1 | 0 | 0 | 7 |
| 0 | 1 | 0 | 0 | 0 | 0 | 1 | 0 | 1 | 0 | 0 | 0 | 0 | 1 | 0 | 0 | 0 | 1 | 0 | 0 | 6 |
| 0 | 0 | 1 | 0 | 0 | 0 | 1 | 0 | 0 | 0 | 1 | 0 | 0 | 1 | 0 | 0 | 0 | 0 | 0 | 0 | 1 |
| 0 | 0 | 0 | 1 | 0 | 1 | 0 | 0 | 0 | 0 | 0 | 1 | 0 | 1 | 0 | 0 | 0 | 0 | 0 | 1 | 7 |
| 0 | 0 | 0 | 1 | 0 | 0 | 0 | 1 | 1 | 0 | 0 | 0 | 0 | 0 | 1 | 0 | 1 | 0 | 0 | 0 | 4 |
| 0 | 0 | 0 | 1 | 0 | 0 | 0 | 1 | 0 | 0 | 0 | 0 | 0 | 0 | 1 | 0 | 0 | 0 | 0 | 1 | 1 |
| 0 | 0 | 0 | 0 | 0 | 1 | 0 | 0 | 0 | 0 | 1 | 0 | 0 | 0 | 0 | 1 | 0 | 0 | 0 | 1 | 4 |
| 1 | 0 | 0 | 0 | 1 | 0 | 0 | 0 | 1 | 0 | 0 | 0 | 1 | 0 | 0 | 0 | 1 | 0 | 0 | 0 | 1 |

Figure 6

| | Conjoint analysis with individual elements as variables | | | Conjoint analysis with individual elements and pairwise element combinations as variables | | |
|---|---|---|---|---|---|---|
| Multiple R | 0.11 | | | 0.19 | | |
| St. Error Estimate | 30.63 | | | 40.21 | | |
| Effect | *Utility Value (Coefficient)* | *T value* | *P(2 Tail)* | *Utility Value (Coefficient)* | *T value* | *P(2 Tail)* |
| Constant | 12.01 | 3.29 | 0.00 | 14.86 | 3.99 | 0.00 |
| A1 | -1.13 | -0.53 | 0.60 | 4.08 | 1.57 | 0.12 |
| A2 | -1.25 | -0.58 | 0.56 | -6.15 | -2.37 | 0.02 |
| A3 | -2.36 | -1.09 | 0.27 | -2.65 | -1.23 | 0.22 |
| A4 | -4.83 | -2.23 | 0.03 | -6.64 | -2.84 | 0.00 |
| B1 | 8.53 | 3.79 | 0.00 | 3.93 | 1.51 | 0.13 |
| B2 | 3.00 | 1.31 | 0.19 | -3.19 | -1.16 | 0.25 |
| B3 | 5.40 | 2.39 | 0.02 | 7.17 | 2.94 | 0.00 |
| B4 | 3.85 | 1.67 | 0.09 | 5.22 | 2.11 | 0.03 |
| C1 | 3.81 | 1.72 | 0.09 | 0.59 | 0.25 | 0.81 |
| C2 | 3.94 | 1.78 | 0.08 | 3.53 | 1.60 | 0.11 |
| C3 | 2.12 | 0.94 | 0.35 | 0.64 | 0.29 | 0.78 |
| C4 | 1.81 | 0.82 | 0.41 | 2.92 | 1.22 | 0.22 |
| D1 | 0.72 | 0.33 | 0.74 | -2.31 | -0.96 | 0.34 |
| D2 | 3.68 | 1.68 | 0.09 | 3.47 | 1.60 | 0.11 |
| D3 | 4.34 | 2.01 | 0.04 | 1.27 | 0.42 | 0.68 |
| D4 | 0.24 | 0.11 | 0.91 | 2.01 | 0.83 | 0.41 |
| E1 | 3.30 | 1.31 | 0.19 | 0.56 | 0.18 | 0.86 |
| E2 | 5.50 | 2.17 | 0.03 | 5.65 | 2.25 | 0.02 |
| E3 | 4.69 | 1.86 | 0.06 | 5.95 | 2.21 | 0.03 |
| E4 | 1.11 | 0.44 | 0.66 | 0.00 | 0.00 | 1.00 |
| A1B4 | | | | -11.75 | -2.23 | 0.03 |
| A4C1 | | | | 10.33 | 2.01 | 0.04 |
| A1D4 | | | | -10.38 | -2.16 | 0.03 |
| A2D1 | | | | 11.21 | 2.31 | 0.02 |
| A2D3 | | | | 20.05 | 3.80 | 0.00 |
| B1D3 | | | | 11.91 | 2.12 | 0.03 |
| B2D3 | | | | 13.96 | 2.57 | 0.01 |
| B1E1 | | | | 11.99 | 2.36 | 0.02 |
| B2E1 | | | | 15.33 | 3.00 | 0.00 |
| B3E3 | | | | -12.38 | -2.49 | 0.01 |
| C4D3 | | | | -11.36 | -2.23 | 0.03 |
| D3E1 | | | | -17.67 | -3.21 | 0.00 |
| Source | *Sum-of-Squares* | *df* | *Mean-Square* | *Sum-of-Squares* | *Df* | *Mean-Square* |
| Regression | 55786.51 | 20 | 2789.33 | 168008.9 | 32 | 5250.28 |
| Residual | 4423513 | 2679 | 1651.18 | 4311291 | 2667 | 1616.53 |
| F Ratio | | | 1.69 | | | 3.25 |

Figure 7

| Rating | Pairwise Combinations of Elements from Categories A and B |||||||||||||||| 
|---|---|---|---|---|---|---|---|---|---|---|---|---|---|---|---|---|
| | A1B1 | A1B2 | A1B3 | A1B4 | A2B1 | A2B2 | A2B3 | A2B4 | A3B1 | A3B2 | A3B3 | A3B4 | A4B1 | A4B2 | A4B3 | A4B4 |
| 5 | 0 | 0 | 0 | 0 | 0 | 0 | 1 | 0 | 0 | 0 | 0 | 0 | 0 | 0 | 0 | 0 |
| 1 | 0 | 0 | 0 | 0 | 0 | 0 | 1 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 | 0 | 0 | 0 | 0 |
| 1 | 0 | 0 | 0 | 0 | 1 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 5 | 0 | 1 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 1 | 0 | 0 | 0 | 0 | 0 | 0 |
| 5 | 0 | 0 | 0 | 0 | 0 | 0 | 0 | 0 | 0 | 0 | 0 | 0 | 1 | 0 | 0 | 0 |
| 5 | 0 | 0 | 0 | 0 | 0 | 0 | 0 | 0 | 0 | 0 | 0 | 0 | 0 | 0 | 0 | 0 |
| 1 | 0 | 0 | 0 | 0 | 1 | 0 | 0 | 0 | 0 | 0 | 0 | 0 | 0 | 0 | 0 | 0 |
| 5 | 0 | 0 | 0 | 1 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 1 |
| 5 | 1 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 1 | 0 | 0 |
| 5 | 0 | 0 | 0 | 0 | 0 | 0 | 0 | 1 | 0 | 0 | 0 | 0 | 0 | 0 | 0 | 0 |
| 6 | 0 | 0 | 0 | 0 | 0 | 0 | 0 | 1 | 0 | 0 | 0 | 0 | 0 | 0 | 0 | 0 |
| 7 | 0 | 0 | 0 | 0 | 0 | 0 | 0 | 0 | 1 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 1 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 1 | 0 | 0 | 0 |
| 5 | 0 | 0 | 0 | 0 | 1 | 0 | 0 | 0 | 0 | 0 | 0 | 0 | 0 | 0 | 0 | 0 |
| 6 | 0 | 0 | 0 | 1 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 1 | 0 | 0 | 0 | 0 | 0 | 0 |
| 7 | 0 | 1 | 0 | 0 | 0 | 0 | 0 | 0 | 0 | 0 | 0 | 0 | 0 | 0 | 0 | 0 |
| 7 | 1 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 1 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 | 0 | 0 | 0 | 0 |
| 1 | 0 | 0 | 1 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 1 |
| 5 | 0 | 0 | 0 | 0 | 0 | 0 | 0 | 0 | 0 | 1 | 0 | 0 | 0 | 0 | 0 | 0 |
| 3 | 0 | 0 | 0 | 0 | 0 | 0 | 0 | 0 | 0 | 1 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 1 | 0 | 0 | 0 | 0 | 0 |
| 4 | 0 | 0 | 0 | 0 | 0 | 0 | 0 | 0 | 0 | 0 | 0 | 0 | 0 | 0 | 1 | 0 |
| 6 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 1 | 0 | 0 | 0 |
| 3 | 1 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 1 | 0 | 0 | 0 | 0 |
| 6 | 0 | 0 | 0 | 0 | 0 | 0 | 1 | 0 | 0 | 0 | 0 | 0 | 0 | 0 | 0 | 0 |
| 1 | 0 | 0 | 0 | 0 | 0 | 0 | 0 | 0 | 0 | 1 | 0 | 0 | 0 | 0 | 0 | 0 |
| 7 | 0 | 0 | 0 | 0 | 0 | 0 | 0 | 0 | 0 | 0 | 0 | 0 | 0 | 1 | 0 | 0 |
| 4 | 0 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 0 | 1 |
| 4 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 |

Figure 8

|    | Category A        |    |    |    |    | Category B |    |    |    |    | Category C |    |    |    |    | Category D |    |    |    |    | Category E |    |    |    |    |
|----|----|----|----|----|----|----|----|----|----|----|----|----|----|----|----|----|----|----|----|----|----|----|----|----|----|
|    | A0 | A1 | A2 | A3 | A4 | B0 | B1 | B2 | B3 | B4 | C0 | C1 | C2 | C3 | C4 | D0 | D1 | D2 | D3 | D4 | E0 | E1 | E2 | E3 | E4 |
| Constant | 23 | 22 | 11 | 29 | 19 | 18 | 28 | 27 | 22 | 32 | 22 | 26 | 16 | 25 | 23 | 20 | 33 | 16 | 22 | 23 | 28 | 24 | 26 | 19 | 21 |
| A1 | x | x | x | x | x | 3 | -3 | -3 | 7 | 2 | -2 | 1 | -3 | 5 | 2 | 1 | 1 | -5 | 4 | 9 | 8 | 14 | 3 | 7 | 9 |
| A2 | x | x | x | x | x | -3 | -4 | -8 | -1 | -7 | -8 | -7 | -4 | -2 | -1 | -7 | -5 | -4 | 0 | -8 | 14 | 18 | 16 | 19 | 13 |
| A3 | x | x | x | x | x | 9 | 10 | 10 | 13 | 12 | 8 | 12 | 7 | 13 | 10 | 7 | 12 | 8 | 14 | 3 | 11 | 9 | 8 | 13 | 22 |
| A4 | x | x | x | x | x | 21 | 14 | 15 | 20 | 18 | 17 | 21 | 17 | 23 | 18 | 20 | 22 | 14 | 18 | 16 | -2 | 1 | -5 | 9 | 6 |
| B1 | 10 | 5 | 11 | 12 | 2 | x | x | x | x | x | 5 | 6 | 3 | 14 | 6 | 7 | 7 | 9 | 5 | 11 | 10 | 3 | 6 | -5 | 3 |
| B2 | 8 | 5 | 4 | 8 | 3 | x | x | x | x | x | 5 | 2 | 4 | 7 | 10 | 7 | 3 | 9 | 4 | 5 | 16 | 6 | 6 | 12 | 2 |
| B3 | 3 | 5 | 6 | 5 | 2 | x | x | x | x | x | 3 | 2 | 6 | 1 | 6 | 4 | 0 | 10 | 3 | 6 | 2 | -1 | 3 | 3 | 4 |
| B4 | 7 | 6 | 6 | 11 | 4 | x | x | x | x | x | 12 | 6 | 2 | 5 | 6 | 9 | 7 | 16 | 6 | 6 | 2 | -4 | 8 | 9 | 2 |
| C1 | 2 | 6 | 4 | 6 | 6 | 6 | 6 | 2 | 4 | 0 | x | x | x | x | x | 6 | 4 | -1 | 8 | 4 | 3 | 7 | 5 | 7 | 6 |
| C2 | -6 | -6 | 0 | -5 | -6 | -2 | -7 | -3 | -2 | -12 | x | x | x | x | x | -5 | -8 | -2 | -3 | 2 | 2 | 5 | 3 | -4 | 2 |
| C3 | 3 | 11 | 8 | 6 | 7 | 6 | 15 | 8 | 3 | -2 | x | x | x | x | x | 8 | 8 | 3 | 6 | 5 | -9 | -10 | -6 | -10 | -6 |
| C4 | 0 | 3 | 8 | 2 | 0 | 2 | 2 | 8 | 5 | -4 | x | x | x | x | x | 4 | 1 | 2 | 5 | 4 | 4 | 2 | 9 | 5 | 7 |
| D1 | 8 | 10 | 11 | 14 | 10 | 12 | 12 | 8 | 8 | 10 | 13 | 11 | 9 | 12 | 11 | x | x | x | x | x | 3 | 6 | 6 | 15 | 9 |
| D2 | -4 | -9 | 2 | -4 | -9 | -6 | -5 | -1 | -1 | 2 | -3 | -8 | 1 | -7 | -6 | x | x | x | x | x | 5 | -3 | 2 | 2 | 8 |
| D3 | -1 | 2 | 7 | 5 | -4 | 4 | 0 | 1 | 5 | 1 | 1 | 4 | 4 | 3 | 3 | x | x | x | x | x | -13 | -5 | -11 | -4 | -14 |
| D4 | 3 | 11 | 4 | -2 | -1 | 3 | 8 | 0 | 4 | 1 | 1 | 2 | 8 | -1 | 2 | x | x | x | x | x | 7 | 8 | 3 | 4 | 10 |
| E1 | 7 | 5 | -4 | 0 | -1 | 1 | 5 | 1 | -2 | -3 | 4 | 3 | 3 | 1 | -3 | 12 | 11 | 4 | 7 | -1 | x | x | x | x | x |
| E2 | 4 | -2 | -1 | 1 | 1 | 0 | 4 | 1 | 2 | 7 | 8 | -1 | 2 | 6 | 5 | -7 | -6 | -2 | -7 | -4 | x | x | x | x | x |
| E3 | 8 | 6 | 5 | 12 | 17 | 14 | 0 | 8 | 7 | 14 | 8 | 8 | 3 | 10 | 8 | 3 | 3 | 1 | -3 | 5 | x | x | x | x | x |
| E4 | 3 | 2 | -7 | 16 | 9 | -1 | 5 | -3 | 6 | 6 | 3 | 3 | 1 | 7 | 4 | -1 | 3 | 6 | 5 | 3 | x | x | x | x | x |

SYSTEM AND METHOD FOR PERFORMING CONJOINT ANALYSIS

CROSS-REFERENCE TO RELATED APPLICATIONS

The present application is a continuation of U.S. patent application Ser. No. 11/032,834 filed on Jan. 10, 2005, and issued as U.S. Patent No. 7,941,335, which claims the benefit of U.S. Provisional Application No. 60/538,787, filed on Jan. 23, 2004, each of which is expressly incorporated herein in its entirety by reference thereto.

FIELD OF THE INVENTION

The present invention relates to a system and method for performing conjoint analysis.

BACKGROUND INFORMATION

An article, for example a product, its packaging, and/or an advertisement, may include a number of pieces (categories of elements). Each category may include a number of versions of a particular item (elements). For example, a number of versions of a background may be grouped together in a background category. The article's appeal, e.g., consumer appeal, may depend upon the particular elements of the included categories that are included in the article. For example, a package design that includes one version of text and/or a background may be more appealing than a package design that includes a different version of the text and/or background. For example, a package design that includes a green background may be more appealing than a package design that includes a blue background. As a further example, in case of an advertisement, one particular combination of text messages may be more appealing than another combination of text messages.

Before producing an article, companies, particularly marketing companies or marketing departments of many companies, design test concepts for the article. The test concepts may be designed manually or through computer generation. Element categories and specific elements vary between the various test concepts. For a particular article, a company may present a number of test concepts to a panel of respondents, and the respondents rate each concept. To determine which combination of elements produces the most appealing article, a utility value for each of the possible elements is obtained. The utility values are obtained via an analysis of the returned ratings for the test concepts.

To perform certain types of conjoint analysis, each respondent may be presented with design concepts. Often, articles can be produced from very numerous possible element combinations, sometimes thousands of combinations. Therefore, to present to the respondents each possible combination is highly impractical. Consequently, only a subset of possible element combinations is chosen as design concepts for presentation to the respondents. Although not every element combination is tested, each individual element is tested or imputed through some type of interpolation procedure. A conjoint analysis therefore produces a utility value for each of the individual elements.

However, although individual elements may have high utility values, indicating that each of the individual elements can significantly contribute to the article's appeal, in combination the elements may significantly reduce (suppression) or increase (synergism) the article's appeal. This effect is generally referred to as interactions. Although individual elements may have low or negative utility values, indicating that each of the individual elements can significantly reduce, or at least not contribute to the article's appeal, in combination the elements may significantly contribute to the article's appeal. Consequently, to determine which elements, when in combination produce an effect different than that indicated by the utility values of the individual elements, a marketing team must, to some extent, rely on intuition, i.e., an imperfect analysis that often produces incorrect results, and must test a few of these combinations.

There is believed to be a need for a system and method that may identify the extent to which utility values of individual elements are affected by a combination of the individual elements, rather than testing a few predefined combinations.

SUMMARY

According to an example embodiment of the present invention, a method includes: obtaining a rating for a plurality of concepts created based on a plurality of experimental designs, each experimental design including a plurality of categories, each category including a plurality of elements; and determining, in accordance with the ratings obtained in the obtaining step, utility values for each element of each category and for at least one combination of elements in a plurality of categories.

The determining step may include performing a linear regression on the ratings obtained in the obtaining step.

The regression may include a least squares regression.

The ratings may correspond to a dependent variable of the linear regression, and data corresponding to presence and absence of the elements and their interactions may correspond to independent variables of the linear regression.

The obtaining step may include: presenting the experimental designs to respondents; and receiving the ratings for the experimental designs presented in the presenting step from the respondents.

The experimental designs may be presented to the respondents in the presenting step via a communications network.

Each respondent may be presented in the presenting step with experimental designs that include concepts that contain each of the elements in each of the categories. Alternatively, each respondent may be presented in the presenting step with only some of the elements, and untested elements' utilities may be imputed through an interpolation algorithm.

The presenting step may include displaying the concepts created according to the experimental designs on a display device.

The combination of elements may correspond to a pair wise combination of elements in different categories.

The combination of elements may correspond to each pair wise combination of elements in each of the categories.

The utility values may be determined in the determining step according to the relationship:

$$\text{Rating} = k_0 + k_1 * \text{Element\_1} + k_2 * \text{Element\_2} + k_3 * \text{Element\_3} + \ldots k_n * \text{Element\_}n + k_{c1} * \text{Combination\_1} + k_{c2} * \text{Combination\_2} \ldots + k_{cm} * \text{Combination\_}m.$$

In this relationship, Rating represents the rating of the concepts, $k_0$ represents a constant; Element_1, Element_2, Element_3, ... Element_n represent presence or absence of a corresponding element; $k_1, k_2, k_3, \ldots k_n$ represent the utility value for a corresponding element; Combination_1, Combination_2, Combination_3, ... Combination_m represent presence or absence of a corresponding combination of multiple elements in different categories; and $k_{c1}, k_{c2}, k_{c3}, \ldots k_{cm}$ represent the utility value for a corresponding combination of multiple elements.

According to an example embodiment of the present invention, a device includes: means for obtaining a rating for a plurality of concepts created based on a plurality of experimental designs, each experimental design including a plurality of categories, each category including a plurality of elements; and means determining, in accordance with the ratings obtained by the obtaining means, utility values for each element of each category and for at least one combination of elements in a plurality of categories.

According to an example embodiment of the present invention, a computer-readable storage medium has stored thereon a set of instructions adapted to be executed by a processor to implement a method, and the method includes the steps of: obtaining a rating for a plurality of concepts created based on a plurality of experimental designs, each experimental design including a plurality of categories, each category including a plurality of elements in each of a plurality of categories; and determining, in accordance with the ratings obtained in the obtaining step, utility values for each element of each category and for at least one combination of elements in a plurality of categories.

According to an example embodiment of the present invention, a system includes: a processor configured to obtain a rating for a plurality of concepts created based on a plurality of experimental designs, each experimental design including a plurality of categories, each category including a plurality of elements in each of a plurality of categories, the processor configured to determine, in accordance with the ratings obtained, utility values for each element of each category and for at least one combination of elements in a plurality of categories.

BRIEF DESCRIPTION OF THE DRAWINGS

FIG. 1 illustrates an example basic experimental design.

FIG. 2 illustrates example permuted experimental designs.

FIG. 3 illustrates element categories and their respective elements for generation of article designs.

FIG. 5 is a table that illustrates a recorded list of presented article designs and respective ratings.

FIG. 6 is a table that illustrates results of a conjoint analysis, according to an example embodiment of the present invention.

FIG. 7 is a table that illustrates a recorded list of pairwise element combinations of presented article designs and respective ratings, according to an example embodiment of the present invention.

FIG. 8 is a table that illustrates results of regressions performed upon groups of concepts, according to an example embodiment of the present invention.

DETAILED DESCRIPTION

Figure 4:
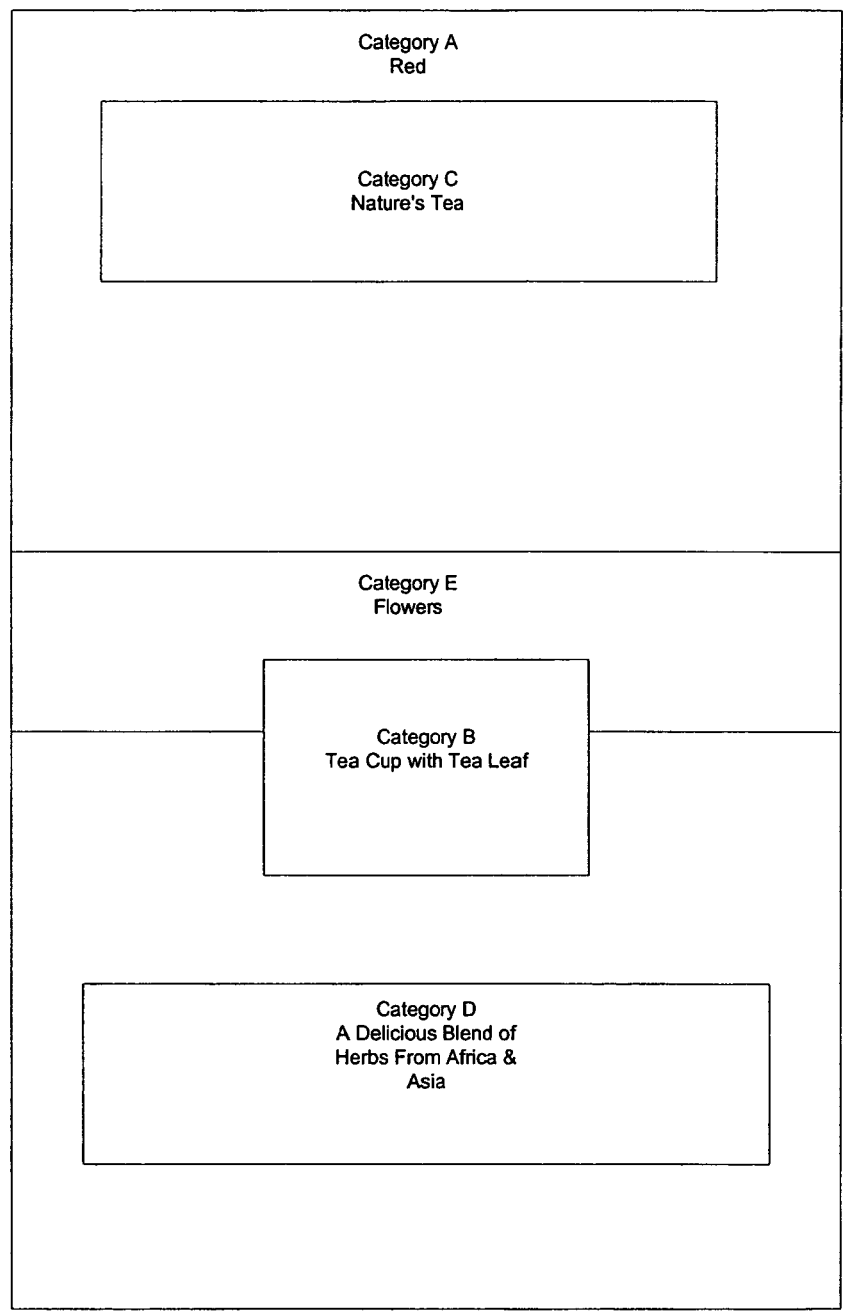
FIG. 4 illustrates an example package design generated by a processor, according to parameters input by a user.

According to an example embodiment of the present invention, a computer system may be provided that assists an operator to perform conjoint analysis so as to determine the utility of individual concept elements and combinations thereof.

A number of possible categories of elements may be utilized in designing an article. One design may include one subset of element categories, while other designs may include other subsets of categories, i.e., a particular article design need not include all possible element categories.

Furthermore, each element category may include a number of elements. A particular article design may include one element or no elements from each element category that can be included in a design. An element may be, e.g., text, a picture, a sound bite, a video clip, etc.

To ultimately choose an optimum article design, a number of experimental designs may be created. A number of concepts may be created based on the experimental designs. The concepts may be presented to respondents. A respondent may rate each concept presented to the respondent.

A processor may be provided to generate the experimental designs and concepts. For example, in an example embodiment of the present invention, the processor may generate a basic experimental design as illustrated in FIG. 1. The basic experimental design may include a number of category placeholders, e.g., that are not assigned to particular element categories, and may include for each placeholder category a number of placeholder elements, e.g., that are not assigned to particular elements. For example, each placeholder category may represent a particular position, e.g., top, bottom, behind, in front, etc. The basic experimental design may include a number of placeholder concepts. Each placeholder concept may include a particular combination of placeholder elements. In FIG. 1, each row represents a placeholder concept. Each column represents a placeholder element, (where $pl_{xy}$ stands for element y of category x).

To generate a number of experimental designs, the processor may permute the basic experimental design a number of times as illustrated in FIG. 2. Each permutation may include a different assignment of categories of elements to the placeholder categories of the basic experimental design. For example, the first permutation of the basic experimental design (FIG. 2, column 1) may include an assignment of:

category A of an actual element list to PL3;
category B of the actual element list to PL5;
category C of the actual element list to PL2;
category D of the actual element list to PL1;
category E of the actual element list to PL4.

The second permutation of the basic experimental design (FIG. 2, column 2) may include an assignment of:

category A of the actual element list to PL4;
category B of the actual element list to PL1;
category C of the actual element list to PL5;
category D of the actual element list to PL3;
category E of the actual element list to PL2, etc.

Each permutation may also include a different assignment of particular elements of a category to placeholder elements of a corresponding placeholder category. For example, in the first permutation, the elements of category A may be assigned to the element placeholders as follows: $A_1$ to $pl_{32}$; $A_2$ to $pl_{34}$, etc. The assignment of the actual element categories to placeholder categories and of the actual elements to placeholder elements may be, e.g., by a random assignment or according to some algorithm.

A user interface, e.g., a graphical user interface (GUI) may be provided for user input. A user, e.g., a marketing researcher, may indicate to the processor via the GUI the possible element categories and the possible elements of each category to be used to create the concepts. For example, FIG. 3 illustrates elements that may be combined by a processor to define the concepts. As illustrated in FIG. 3, a number of categories may each include a number of elements. For example, five categories may be provided, and each category may include, e.g., four elements, that may be used to create a package design for, e.g., tea. Although in this example, each category includes the same number of possible elements, a user may provide for a different number of possible elements for each category. In this example, the user has indicated that the processor may generate a package design that includes a background color (Category A). The background color may be red, blue, green, or yellow. The package design may further include an image (Category B). FIG. 3 illustrates that the image of Category B may be a tea kettle, a tea cup with a tea leaf, an ornate tea cup without a saucer, or a plain tea cup with a saucer. The package design may include a tag line (Category C). As illustrated in FIG. 3, the tag line may be "Soothing Tea," "Nature's Tea," "Healthy Drink," or "Natural Remedy." The package design may include an indication of ingredients (Category D). As illustrated in FIG. 3, the indication of ingredients may be "A Delicious Blend of Herbs From Africa & Asia," "Made With Natural Herbs," "With Natural Lemon Flavor," or "With Organic Chamomile." The package design may further include package visuals (Category E). As illustrated in FIG. 3, the package visuals may be men on a field, leaves on a tree, a road in the wilderness, or flowers. It should be understood that these categories and elements are merely illustrative of an example of categories and elements of experimental designs and are in no manner intended to be limiting.

It should be appreciated that any number of categories may be provided and that any number of elements may be provided in each category. It should be further understood that the number of elements in each category need not be equal to each other or equal to the number of elements in any other category.

The processor may generate concepts by combining elements of the element categories, e.g., according to the experimental designs. For example, FIG. 4 illustrates a particular package design generated by the processor based upon the input table of FIG. 3. All, some, or one of the element categories may be used for a particular generated concept. For example, the processor may generate a package design similar to that of FIG. 4, but exclude from the package design any picture of background scenery. As an additional example, the processor may generate a concept that includes only text messages. Only one element from each included category may be used for the particular generated concept. For example, a package design's background may be either blue or red, but not both (unless, for example, a mixture of blue and red is itself another inputted possible element of category A).

The generated concepts may be presented to respondents. For example, the generated concepts may be printed and displayed to a panel of respondents. Alternatively, the concepts may be displayed on a computer screen. For example, the respondents may each be in a different location. Each location may be provided with a terminal that includes a GUI. The concepts, such as the image of FIG. 4, may be transmitted, via a communications network, e.g., the internet, towards the terminals so that the respondents may view the concepts. By presenting the concepts to a panel of respondents via a communications network, e.g., the internet, a large sample of responses may be obtained, e.g., a larger sample than a conventional in-person focus group study.

Alternatively, marketing researchers may manually create the concepts. For example, they may draw illustrations representing the various article designs or may create article prototypes. Conventional methods for creating article designs may be used.

After a concept is presented to a respondent, the respondent may rate the concept, e.g., to indicate the degree of the concept's appeal. A processor may record the concepts that are presented and the returned rating for each presented concept.

FIG. 5 is an example table recorded by a processor that lists fifty different presented concepts and their corresponding ratings. The table indicates that each concept may be generated from the, e.g., five, categories referred to above, with each category including, e.g., four, elements. Thus, each concept includes one of the elements in each category. In general, the number of possible concepts for a number of n categories with each category having a number of $m_n$ elements corresponds to $m_1 * m_2 * m_3 * \ldots m_n$. There may be a number of known experimental designs that allows for obtaining elements' utility values using only a subset of all possible concepts, e.g., Ideamap. It should be understood that a concept need not include an element for each category.

In this example, for each concept, the table indicates the presence of an element by a value of 1 and the absence of an element by a value of 0.

The panel of respondents may be chosen as a closed panel with a finite number of participating respondents.

Alternatively, the panel may be an open panel. For example, the concepts may be uploaded to an internet web page for access by internet users. The panel of respondents may then include all internet surfers who access the web page and rate the concepts.

It is possible to perform conjoint analysis upon respondent ratings of concepts in order to determine a relative utility value for each element that may be used for design of an article. All concept ratings, e.g., as recorded in the table of FIG. 5, may be used as input for the conjoint analysis. The output may be the utility values. To perform conjoint analysis, regression techniques may be used. For example, least squares regression may be used. Other regression techniques may be used in performing the conjoint analysis. FIG. 6 is a table that illustrates results of a least squares regression. The left side of the table lists the utility values of a regression, the output of which is a list of utility values for each possible element.

An element's utility value may be, for example, a coefficient. An equation may be used to determine a concept's overall utility value. Each possible element may be a variable of the equation. In calculating the result for the equation, each element coefficient may be multiplied by the presence or absence in the design of the coefficient's associated element, where a value of 1 represents an element's presence and a value of 0 represents an element's absence. For example, a particular concept's utility value may be the sum of all coefficients of the elements included in the particular concept plus a predetermined constant. The predetermined constant may be ascertained, for example, as an output of the conjoint analysis.

In this regard, regression may be performed to determine the coefficients k based on the relationship:

$$\text{Rating} = k_0 + k_1 * \text{Element\_1} + k_2 * \text{Element\_2} + k_3 * \text{Element\_3} + \ldots k_r * \text{Element\_r}.$$

Thus, each element of each category may be treated in the regression as an independent variable. For example, Element_1 may represent the presence/absence of element A1, Element_2 may represent the presence/absence of element A2, Element_3 may represent the presence/absence of element A3, Element_r may represent the presence/absence of element E4, and the coefficients k may represent the utility of the corresponding element.

In an example embodiment of the present invention, conjoint analysis may be performed to ascertain a utility value for each possible element of an article design and for each possible combination of a pair of possible elements. It should be understood that combinations of two or more elements of different categories may be analyzed in the regression to determine utility values for pair wise or other multiple combinations of elements in two or more categories. For example, according to an example embodiment of the present invention, utility values for individual elements A1, A2, A3, A4, B1, B2, B3, B4, C1, C2, C3, C4, D1, D2, D3, D4, E1, E2, E3 and E4 may be determined along with utility values of combinations of multiple elements, e.g., A1B1, A1B2, A1B3, A1B4, A1C1, A1C2 . . . D4E2, D4E3, D4E4; and/or; A1B1C1 . . . C4D4E4; and/or A1B1C1D1 . . . B4C4D4E4; and/or A1B1C1D1E1 . . . A4B4C4D4E4; etc.

According to an example embodiment of the present invention, for each recorded rating, the processor may additionally record the presence or absence of each pair wise or other multiple element combination in the corresponding concept. FIG. 7 is an additional portion of the example table of FIG. 5, that illustrates the recording of the presence or absence in each of the fifty rated concepts of each pair wise combination of the elements of categories A and B. Where a concept may be generated from a number of categories of elements, a utility value for each pair wise combination of elements that are of different categories may be ascertained. To ascertain the utility value for each pair wise element combination in addition to the utility value for each individual element, each pair wise element combination may be treated as an additional element when performing the conjoint analysis. For example, for five possible categories of elements, with each category including a possible of four elements that may be used to produce an article, least squares regression may be used to ascertain the utility values for the twenty elements and their pair wise or other multiple combinations. Consequently, least squares regression may be performed on more than twenty variables. The regression may be performed on variables that include the twenty elements and also their additional 160 pair wise combinations. The right side of the table of FIG. 6 lists some of the utility values of a regression, the output of which is a list of utility values for each possible element and each possible element combination. The system may recognize that certain pair wise or other multiple combinations of elements have an insufficient effect on the rating, e.g., have low utility values, and may be effectively discarded.

In an example embodiment of the present invention, conjoint analysis may be performed to ascertain a utility value for even more than the pair wise element combinations, e.g., each three element combination, or even every possible element combination. For example, if five categories of elements, each category including four possible elements, may be used for designs of an article, 3,104 element combinations may be included as variables when performing a least squares regression. In an example embodiment, the individual elements, the pair wise element combinations, the three element combinations, etc., may each be treated as an individual variable when performing a least squares regression.

In this regard, regression may be performed to determine the coefficients k based on the relationship:

$$\text{Rating} = k_0 + k_2 * \text{Element\_1} + k_2 * \text{Element\_2} + k_3 * \text{Element\_3} + \ldots k_n \text{Element\_n} + k_{c1} * \text{Combination\_1} + k_{c2} * \text{Combination\_2} \ldots + k_{cm} * \text{Combination\_m}.$$

With k representing the utility values of the corresponding element Element_x or combination of elements Combination_x, Element_x in each instance representing the presence/absence of an individual element, and Combination_x representing the presence/absence of a combination of multiple elements.

In an example embodiment of the present invention, to perform conjoint analysis to ascertain a utility value for each possible element and each possible pair wise combination, the system may require generation and presentation of and ratings for concepts that include at least all possible pair wise combinations of elements. The presentation of all of the possible pair wise or other multiple combination of elements does not, however, need to be presented to a single respondent. Each respondent may be presented elements in different combinations than other respondents so that among the entire group of respondents, every analyzed combination of elements has been presented to at least one respondent. For example, if conjoint analysis is performed to ascertain the utility value of twenty elements and the 160 possible pair wise combinations thereof, the system may require ratings for designs that include at least all 160 pair wise element combinations. Additionally, it may be required that a set of concepts be included where each concept of the set entirely omits a category of elements, so that for each category of elements, at least one concept omits the category. Since the presence of an element may be compared to the lack of any element from its corresponding category, the absolute utility value of the element may therefore be determined.

In an example embodiment of the present invention, the generated concepts may include for each possible element and for each possible pair wise combination of the possible elements at least one concept. In an example embodiment of the present invention, the generated concepts may include for each possible combination of all possible elements at least one concept. In an example embodiment of the present invention, elements of a number of categories may be used to generate concepts, and the generated concepts may include for each possible pair wise combination of elements that are not of the same category at least one concept. In an example embodiment of the present invention, elements of a number of categories may be used to generate concepts, and the generated concepts may include for each possible combination of elements that are not of the same category at least one concept.

Each respondent of a panel may be presented with the same concepts. For example, if one hundred concepts are presented, all one hundred may be presented to each respondent. Accordingly, responses of a respondent who stops rating designs prior to rating all concepts may be disregarded. For example, concepts may be presented to respondents in a series of web site pages, e.g., via a GUI of a computer terminal. A respondent's responses may be disregarded if the respondent exits the web site prior to viewing all pages of the web site, or prior to entering data, i.e., a rating, for each viewed page.

In an example embodiment of the present invention, in order to test a great number of concepts, the system may vary between the respondents of a panel the experimental designs presented to the various respondents of the panel. For example, a processor may generate 100 experimental designs, e.g., by permuting a basic experimental design, e.g., of FIG. 1. Each permuted design may be treated as a new experimental design with a different set of concepts. Each resulting experimental design may be in accordance with the design structure of the basic experimental design. For example, each permutation of the basic experimental design of FIG. 1 may include 25 concepts, as does the basic experimental design of FIG. 1. The experimental designs may be presented to the respondents so that the panel collectively is presented with some or all of the 100 designs. It may be that some concepts presented to one respondent are not presented to other respondents. In an example embodiment, the processor may present concepts to respondents in a series of web pages. As a respondent works through the web pages and enters a response for each web page, the system may record and consider each response as it is entered. Numerous respondents may rate concepts of an experimental design. The system, e.g., a processor, may record and consider, e.g., use as input for a conjoint analysis, each respondent's ratings for the experimental design.

In an example embodiment of the present invention, generated experimental designs may be presented to a panel of respondents collectively, so long as all the required concepts are rated. In an example embodiment of the present invention, even where only a subset of the required concepts is presented to each respondent, each respondent may be presented with concepts that allows for estimation of the utilities of each possible element directly or indirectly using an input algorithm.

In an example embodiment of the present invention, the number of distinctive concepts presented to a panel of respondents may far outnumber the number of possible pair wise combinations of elements. Even so, each respondent may be presented only approximately a number of concepts required to present all possible elements, or all possible pair wise element combinations. Alternatively, each respondent may be presented a number of concepts less than that required to present all possible pair wise element combinations. Each respondent may be presented a number of concepts even less than that required to present all possible elements. According to this example embodiment, the processor may determine the utility values of each element and/or pair wise element combination by combining concept ratings of permuted experimental designs presented to multiple respondents, where the combined presented concepts includes all elements and pair wise combination of elements.

Each respondent may test more concepts than the elements in order for a regression to be able to calculate the part worth utilities of each element. The same may also apply to all pair wise combinations of elements. Even if each respondent may not be able to test many concepts which include every possible pair wise combination of element, the processor may combine multiple respondents' permuted designs to calculate the utilities of the pair wise combinations. In the example above, with five categories with four elements in each, there are 160 unique pair wise combinations (only the combinations from the different categories are meaningful; the pair wise elements from the same category may not be meaningful). In the example of the experimental design above, there are 25 concepts in each permuted design, so each respondent evaluates 25 concepts. It thus may be easy to provide a sufficiently large panel for every meaningful pair wise combination to be tested at least once by one or more respondents.

In an example embodiment of the present invention, to improve the quality of data, the system and/or method may present the experimental designs to a panel of respondents and may balance among the individual respondents of the panel the number of times a particular pair wise element combination is presented. For example, the processor may generate multiple permuted experimental designs and calculate how many times each pair wise combination is included in each such design. The processor may pick and choose the subset of the designs that allows for the most balanced (even) number of times each combination is tested.

In an example embodiment of the present invention, to improve the quality of data, the system and/or method may divide concepts into groups, obtain ratings for each group of concepts, and perform conjoint analysis upon each group of ratings. For each element, a different utility value may thereby be determined with respect to each group. In each group of concepts, a particular element from a particular category may be selected as a constant element. Accordingly, either all of the concepts of a particular group include the constant element, or all of the concepts of the particular group exclude the constant element.

The system and/or method may accordingly provide an additional manner in which one may determine the impact of a specific element on other elements by providing a context for each determination of the elements' utility values. The constant element may be the context in which the utility values are determined. For example, the effect of each tag line of category C (and the effect of the absence of a tag line) upon the utility values of elements of the other categories A, B, D, and E may be determined by running a regression model for each of the five cases (the four tag lines and the absence of a tag line). In the first case, the system and/or method may use only the ratings of concepts that include the tag line "Soothing Tea" when running the regression model, and may thereby determine the utility values for each of the elements of the other categories A, B, D, and E. Since only one element or no elements from each category may be present in a concept, utility values of elements of the category to which the constant element belongs is not determined.

In the second case, the system and/or method may use only the ratings of concepts that include the tag line "Nature's Tea" when running the regression model, etc. In one case, the system and/or method uses only the ratings of concepts that do not include a tag line at all. In this manner, the utility values of each element of the other categories A, B, D, and E may be determined such that the tag lines do not impact their utility values.

FIG. 8 is a table that lists utility values of each of the elements of categories A to E obtained by performing conjoint analysis upon ratings of groups of concepts, where each group includes a constant element. Each column represents a group of concepts. For example, column A0 lists the utility values of each of the elements in categories B to E for the group of concepts that does not include any element from the background category (category A). Since, in the illustrated example, the utility values of elements of five categories are determined, the system and/or method may run 25 regressions in total. The 25 regressions include one regression for each element of each of the five categories, and one additional regression for each category for the absence of all elements of the category. Accordingly, the table of FIG. 8 includes 25 columns, each representing a regression.

As illustrated in FIG. 8, columns A0 to E0 denote models (scenarios) when no element from the corresponding category is present in any concept. Each "non-zero" column (e.g., C2) represents a model in which this element (e.g., C2) is always present in each concept and creates a "context" or background for the concepts. in addition, scenarios (interactions) between the elements from the same category may be meaningless. Moreover, each row (e.g., element B2) shows utilities for the element under different scenarios. For example, row B2 and column A0 contains the utility for element B2 in the scenario in which no element from category A appears. Row B2 and column D4 contain the utility of the element B2 under the scenario in which the element D4 is always present in every concept, etc.

In an example embodiment of the present invention, the system may estimate interactions in a manner which allows seeing the impact of a specific element on other elements, e.g., providing a kind of "scenario" model. For example, if one of the categories contains several brand names, one of the findings may be the effect of a brand on the utilities of the elements from other categories. The system may select the cases (concepts) from the design which contain only the ones with a specific element present. For example, if the brand category has four elements ("Brand A," "Brand B," "Brand C" and "Brand D"), the system may run a regression model for each of the four cases. In the first case, the system will use only the concepts and ratings containing "Brand A" element and obtain the utilities for the elements from other categories (it may not make sense to obtain utilities from the elements in the "Brand" category). Next, the system may run a regression on a subset of the concepts and ratings wherein only "Brand B" is present and so on. This approach may allow for estimating the utilities of the elements in the context of a specific element always present, to provide another manner of estimating interactions.

The system may also to estimate the utilities of the elements in absence of any elements from, e.g., the "Brand" (or any other) category. This will provide the utilities of other elements without any impact of a brand on them. In that case, for example, the system may select only the concepts and ratings from the design which do not include any elements from the "Brand" category.

In an example embodiment of the present invention (e.g., a project with five categories and four elements in each), the system may run 25 regressions in total: one for every element in each of the categories (twenty regressions—to estimate utilities of the elements in the context when this element is always present in each concepts) and one for every category when no element from it appears in any of the concepts (total of five regressions—one per each category).

In an example embodiment of the present invention, the system may report, e.g., to a user, results of the conjoint analysis. The system may report the results via a GUI, a printout, a conventional method of reporting, etc. The results may include each ascertained utility value. For example, in an example embodiment where the variables of the conjoint analysis include each individual element and each pair wise element combination, the system may report the utility value for each individual element and each pair wise element combination. In an example embodiment of the present invention, the report may be a table such as that of FIG. 6.

An element combination's utility value may be consistent with the utility values of the combination's individual elements. For example, the combination's utility value may indicate that the combination will significantly contribute to an article's appeal, and utility values of the combination's individual elements may similarly indicate that each individual element will similarly contribute to the article's appeal. Another combination's utility value may be inconsistent with the utility values of the combination's individual elements. For example, the combination's utility value may indicate that the combination will significantly contribute to an article's appeal, and utility values of the combination's individual elements may, by contrast, indicate that each individual element will significantly reduce the article's appeal.

In an example embodiment of the present invention, the report may include the utility value of each individual element and of only a combination, the utility value of which is inconsistent with the utility value of at least one individual element of the combination. In an example embodiment of the present invention, the report may include the utility value of each individual element and of only a combination, the utility value of which is inconsistent with the utility values of both of the individual elements of the combination. In an example embodiment of the present invention, the report may include the utility value of each individual element and of only a combination, the utility value of which is consistent/inconsistent by a large degree with the utility values of the combination's individual elements. For example, in the table of FIG. 6, only those pair wise element combinations, the utility values of which significantly differ from the sum of the utility values of the corresponding individual elements, have been listed. For example, the utility value of the element combination of A1 and B4 is listed as −11.75, while the utility values of each of the individual elements, A1 and B4, are 4.08 and 5.22, respectively.

In an example embodiment of the present invention, ratings of concepts for conjoint analysis input may be based on a predetermined rating scale. For example, a rating scale of 1 to 9 or 1 to 5, etc. may be used, where the lower extremity indicates least appealing and the highest extremity indicates most appealing or vice versa. The ratings may similarly relate to other ratings criteria, e.g., likelihood of purchase. For example, the ratings listed in the example table of FIG. 5 are based on a rating scale of 1 to 9. In an example embodiment of the present invention, ratings may be based on a binary scale, e.g., 0 indicating a concept's overall lack of appeal and 1 indicating a design's overall appeal, or other scale. In an example embodiment of the present invention, users may respond with ratings based on a predetermined rating scale, and, for conjoint analysis input, the response may be converted into a rating that is in accordance with a binary scale. For example, the system may convert all ratings in the range of 1 to 6 into a rating of 0, e.g., indicating a concept's overall lack of appeal, and may convert all ratings in the range of 7 to 9 into a rating of 1, e.g., indicating a concept's overall appeal.

What is claimed is:

1. A computer-implemented method for determining a value of a product design, the method comprising:
creating, by a computer processor, a plurality of concepts of a plurality of experimental designs, each experimental design including a respective assignment of at least one of (a) a plurality of categories, each category including a plurality of elements, and (b) the plurality of elements of the plurality of categories;
obtaining, by the computer processor and via an input device, at least one rating for each of a subset of the concepts;
performing a regression analysis, by the computer processor and in accordance with the ratings obtained in the obtaining step, thereby determining a respective utility value for each element of each category and for at least one combination of elements in a plurality of categories; and
determining a utility value of a concept, including adding the respective utility values of each element included in the concept and each of the at least one combination of elements that is included in the concept;
wherein:
for each of the plurality of experimental designs of the creating step, each single one of the plurality of concepts includes for each of the categories, at most, one of the elements of the category, different elements of at least one of the categories being includable in different ones of the plurality of concepts;
the determining of the respective utility values for each element of each category and for the at least one combination of elements is performed conditional upon that the subset of the concepts includes:
for each of the plurality of elements, at least one concept that includes the element; and
for each of the at least one combination of elements, at least one concept that includes the combination of elements; and
the determining steps are performed where the subset includes fewer than all possible combinations of the elements, a possible combination being a combination that includes the for each of the categories, at most, one of the elements of the category.

2. The method according to claim 1, wherein the regression analysis includes performing a linear regression on the ratings obtained in the obtaining step.

3. The method according to claim 2, wherein the regression includes a least squares regression.

4. The method according to claim 2, wherein the ratings correspond to a dependent variable of the linear regression and data corresponding to presence and absence of at least one of (a) the elements and (b) combinations of the elements correspond to independent variables of the linear regression.

5. The method according to claim 1, wherein the obtaining step includes:
   presenting the subset of the concepts to respondents; and
   receiving the ratings for the subset of the concepts presented in the presenting step from the respondents.

6. The method according to claim 5, wherein the subset of the concepts are presented to the respondents in the presenting step via a communications network.

7. The method according to claim 5, wherein each respondent is presented in the presenting step with each of the elements in each of the categories.

8. The method according to claim 5, wherein the presenting step includes displaying the subset of concepts on a display device.

9. The method according to claim 1, wherein the combination of elements corresponds to a pair wise combination of elements in different categories.

10. The method according to claim 1, wherein the combination of elements corresponds to each pair wise combination of elements in each of the categories.

11. The method according to claim 1, wherein the utility values are determined in the determining step according to the relationship:

$$\text{Rating} = k_0 + k_1 * \text{Element\_1} + k_2 * \text{Element\_2} + k_3 * \text{Element\_3} + \ldots k_n * \text{Element\_n} + k_{c1} * \text{Combination\_1} + k_{c2} * \text{Combination\_2} \ldots + k_{cm} * \text{Combination\_m};$$

wherein:
   Rating represents the rating of a concept;
   $k_0$ represents a constant;
   Element_1, Element_2, Element_3, . . . Element_n represents presence or absence of a corresponding element;
   $k_1, k_2, k_3, \ldots k_n$ represents the utility value for a corresponding element;
   Combination_1, Combination_2, Combination_3, . . . Combination_m represents presence or absence of a corresponding combination of multiple elements in different categories; and
   $k_{c1}, k_{c2}, k_{c3}, \ldots k_{cm}$ represents the utility value for a corresponding combination of multiple elements.

12. The method of claim 1, wherein different ones of the plurality of experimental designs are formed in the creating step by different assignments of at least one of (a) the plurality of categories and (b) the respective pluralities of elements of the plurality of categories to corresponding portions of an experimental design template.

13. The method according to claim 1, wherein:
   the ratings for different ones of the subset of the concepts are individually obtained from different respective respondents, not all of the subset of the concepts being rated by each of the respondents; and
   the regression analysis is performed directly on the individual ratings provided by the respective respondents.

14. The method of claim 13, wherein each of one or more of the subset of the concepts is rated by more than one of the respondents.

15. A computer-implemented method for determining a value of a product design, the method comprising:
   creating, by a computer processor, a plurality of concepts, each concept including a plurality of elements of a plurality of categories of elements, and different ones of the plurality of concepts including different combinations of elements of the plurality of elements;
   obtaining, by the computer processor and via an input device, at least one rating for each of a subset of the concepts;
   performing a regression analysis, by the computer processor and in accordance with the ratings obtained in the obtaining step, thereby determining a respective utility value for each element of each category and for at least one combination of elements in a plurality of categories; and
   determining a utility value of a concept, including adding the respective utility values of each element included in the concept and each of the at least one combination of elements that is included in the concept;
   wherein:
      each single one of the plurality of concepts created in the creating step includes, for each of the categories of the concept only one of the elements of the category, different elements of at least one of the categories being includable in different ones of the plurality of concepts;
      the determining of the respective utility values for each element and for the at least one combination of elements is performed conditional upon that the subset of the concepts includes:
         for each of the plurality of elements for which a utility value is obtained, at least one concept that includes the element; and
         for each of the at least one combination of elements, at least one concept that includes the combination of elements; and
      the determining steps are performed where the subset includes fewer than all possible combinations of the elements for which a utility value is obtained, a possible combination being a combination that includes at most one element of any of the categories.

16. The method according to claim 15, wherein each concept is created based on an experimental design.

17. A computer-implemented method for determining a value of a product design, the method comprising:
   creating, by a computer processor, a plurality of experimental design concepts from elements of a plurality of categories, wherein each of said plurality of experimental design concepts includes at most one element of each of a subset of the plurality of categories, each category including a plurality of elements, different ones of the plurality of concepts including different combinations of elements of the plurality of elements, and different elements of at least one of the plurality of categories being includable in different ones of the plurality of concepts;
   obtaining, by the computer processor and via an input device, at least one rating for each of a subset of the concepts;
   performing a regression analysis, by the computer processor and in accordance with the ratings obtained in the obtaining step to determine, a respective utility value for each element and for each of at least one combination of elements of a subset of the categories and included in the subset of the concepts; and determining a value of a concept based on the determined utility values;

wherein:

the determining of the respective utility values is performed conditional upon that the subset of the concepts includes:

for each of the elements for which a utility value is determined, at least one concept that includes the element; and for each of the at least one combination of elements, at least one concept that includes the combination of elements; and the determining of the utility values is performed where fewer than all possible combinations of the elements for which utility values are determined, a possible combination being a combination that includes at most one element of each of the plurality of categories.

18. The method according to claim 17, wherein:

at least one specific element is present in each of the concepts; and the subset of categories excludes a category to which the specific element belongs.

19. The method according to claim 17, wherein the determining step includes selecting ratings obtained in the obtaining step for the concepts in which at least one specific element is absent from each of the concepts.

20. The method according to claim 19, wherein the subset of categories excludes a category to which the specific element belongs.

21. The method according to claim 17, wherein the determining step includes:

forming groups of concepts, each group including a respective set of concepts that all include a respective same at least one specific element, the at least one specific element being different for the different groups; and determining different sets of utility values for the different groups.

22. A device for determining a value of a product design, comprising:

means for creating a plurality of concepts of a plurality of experimental designs, each experimental design including a respective assignment of at least one of (a) a plurality of categories, each category including a plurality of elements, and (b) the plurality of elements of the plurality of categories;

means for obtaining at least one rating for each of a subset of the concepts;

means for performing a regression analysis, in accordance with the ratings obtained by the obtaining means, thereby determining a respective utility value for each element of each category and for at least one combination of elements in a plurality of categories; and means for determining a utility value of a concept, including adding the respective utility values of each element included in the concept and each of the at least one combination of elements that is included in the concept;

wherein:

for each of the plurality of experimental designs, each single one of the plurality of concepts includes for each of the categories, at most, one of the elements of the category, different elements of at least one of the categories being includable in different ones of the plurality of concepts;

the determining of the respective utility values for each element of each category and for the at least one combination of elements is performed conditional upon that the subset of the concepts includes:

for each of the plurality of elements, at least one concept that includes the element; and for each of the at least one combination of elements, at least one concept that includes the combination of elements; and the determining steps are performed where the subset includes fewer than all possible combinations of the elements, a possible combination being a combination that includes the for each of the categories, at most, one of the elements of the category.

23. A non-transitory computer-readable storage medium having stored thereon a set of instructions adapted to be executed by a processor, the instructions which when executed cause the processor to implement a method for determining a value of a product design, the method including the steps of:

creating a plurality of concepts of a plurality of experimental designs, each experimental design including a respective assignment of at least one of (a) a plurality of categories, each category including a plurality of elements, and (b) the plurality of elements of the plurality of categories;

obtaining, via an input device, at least one rating for each of a subset of the concepts;

performing a regression analysis, in accordance with the ratings obtained in the obtaining step, thereby determining a respective utility value for each element of each category and for at least one combination of elements in a plurality of categories; and determining a utility value of a concept, including adding the respective utility values of each element included in the concept and each of the at least one combination of elements that is included in the concept;

wherein:

for each of the plurality of experimental designs of the creating step, each single one of the plurality of concepts includes for each of the categories, at most, one of the elements of the category, different elements of at least one of the categories being includable in different ones of the plurality of concepts;

the determining of the respective utility values for each element of each category and for the at least one combination of elements is performed conditional upon that the subset of the concepts includes:

for each of the plurality of elements, at least one concept that includes the element; and for each of the at least one combination of elements, at least one concept that includes the combination of elements; and the determining steps are performed where the subset includes fewer than all possible combinations of the elements, a possible combination being a combination that includes the for each of the categories, at most, one of the elements of the category.

24. A system for determining a value of a product design, comprising:

a processor configured to:

create a plurality of concepts of a plurality of experimental designs, each experimental design including a respective assignment of at least one of (a) a plurality of categories, each category including a plurality of elements, and (b) the plurality of elements of the plurality of categories;

obtain at least one rating for each of a subset of the concepts;

perform a regression analysis, in accordance with the obtained ratings, thereby determining a respective utility value for each element of each category and for at least one combination of elements in a plurality of categories; and determine a utility value of a concept, including adding the respective utility values of each element included in the concept and each of the at least one combination of elements that is included in the concept;

wherein:

for each of the plurality of experimental designs of the creating step, each single one of the plurality of concepts includes for each of the categories, at most, one of the elements of the category, different elements of at least one of the categories being includable in different ones of the plurality of concepts;

the determining of the respective utility values for each category and for the at least one combination of elements is performed conditional upon that the subset of the concepts includes:

for each of the plurality of elements, at least one concept that includes the element; and for each of the at least one combination of elements, at least one concept that includes the combination of elements; and the determinations are performed where the subset includes fewer than all possible combinations of the elements, a possible combination being a combination that includes the for each of the categories, at most, one of the elements of the category.

25. A computer-implemented method comprising:

(a) obtaining, by a computer processor and via an input device, at least one rating for each of a plurality of concepts, each concept including, at most, a respective single element of each of a respective subset of a plurality of categories, different ones of the plurality of concepts including different combinations of the elements, and multiple elements of at least one of the categories being includable in different ones of the plurality of concepts;

(b) performing a regression analysis, by the processor and in accordance with the ratings, thereby determining a respective utility value for each of the elements and for each possible pair wise combination of elements of different ones of the plurality of categories; and (c) determining, by the processor, a utility value of a concept, including adding the utility values, determined in step (b), of each element of the concept and a utility value, determined in step (b), of at least one of the pair wise combination of elements included in the concept.

26. A computer-implemented method comprising:

for each of a plurality of concepts, obtaining, by a computer processor, at least one rating, each of the at least one rating being from a respective individual respondent, wherein different ones of the respondents rate different subsets of the plurality of concepts, such that at least one of the plurality of concepts rated by a first one of the respondents is not rated by a second one of the respondents;

performing, by the processor, a regression analysis directly on the ratings from the respondents to determine utility values of elements included in the concepts; and determining, by the processor, a utility value of a concept including a subset of the elements for which utility values were determined, based on the utility values of the subset of the elements.

27. The method according to claim 26, wherein each of one or more of the plurality of concepts for which respective ones of the ratings are obtained is rated by more than one of the respondents, and the ratings on which the regression analysis is performed includes the multiple ratings obtained for the each of the one or more of the plurality of concepts.

* * * * *